US007817283B2

(12) United States Patent
Gabolde et al.

(10) Patent No.: US 7,817,283 B2
(45) Date of Patent: Oct. 19, 2010

(54) DETERMINING ELECTRIC FIELD CHARACTERISTICS OF LASER PULSES

(75) Inventors: Pablo Gabolde, Atlanta, GA (US); Rick Trebino, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 487 days.

(21) Appl. No.: 11/750,142

(22) Filed: May 17, 2007

(65) Prior Publication Data

US 2008/0285045 A1 Nov. 20, 2008

(51) Int. Cl.
*G01B 9/021* (2006.01)
*G01B 9/02* (2006.01)

(52) U.S. Cl. ...................................... 356/457; 356/485

(58) Field of Classification Search ................. 356/450, 356/457, 484, 485

See application file for complete search history.

(56) References Cited

U.S. PATENT DOCUMENTS

| | | | | |
|---|---|---|---|---|
| 3,633,986 | A * | 1/1972 | Broussaud et al. | 359/27 |
| 5,132,811 | A * | 7/1992 | Iwaki et al. | 359/561 |
| 7,298,489 | B2 * | 11/2007 | Dorrer | 356/450 |
| 2006/0088259 | A1 * | 4/2006 | Weiner | 359/328 |
| 2008/0285031 | A1 * | 11/2008 | Bowlan et al. | 356/326 |

OTHER PUBLICATIONS

Gabolde et al. "Self-referenced measurement of the complete electric field of ultrashort pulses", Sep. 20, 2004, Optics Express vol. 12, No. 19. pp. 4423-4429.*

W. Amir, T.A. Planchon, C.G. Durfee, J.A. Squier, P. Gabolde, R. Trebino and M. Muller, "Simultaneous Visualization of Spatial and Chromatic Aberrations by Two-Dimensional Fourier Transform Spectral Interferometry", vol. 31, No. 19/Optics Letters; Mar. 27, 2006, pp. 2927-2929.

A.P. Kovacs, K. Osvay, ZS. Bor and R. Szipocs, "Group-Delay Measurement on Laser Mirrors by Spectrally Resolved White-Light Interferometry", Optics Letters/vol. 20, No. 7,Oct. 6, 1994, pp. 788-790.

Zoltan L. Horvath, Zsolt Bor, "Focusing of Truncated Gaussian Beams", Optics Communications 222, pp. 51-68, www.sciencedirect.com; Sep. 23, 2002, pp. 51-68.

A.P. Kovacs, K. Osvay, G. Kurdi, M. Gorbe, J. Klebniczki and Z. Bor, "Dispersion Control of Pulse Stretcher-Compressor System with Two-Dimensional Spectral Interferometry", Oct. 18, 2004, Springer-Verlang 2004, Appl. Phys. B80, pp. 165-170.

CL. Froehly, A. Lacourt, et J. CH. Vienot, "Notions de Reponse Impulsionnelle et de Fonction de Transfert Temporelles des Pupilles Optiques, Justifications Experimentales et Applications", Nouv. Rev. Optique, 1973, t. 4, No. 4, pp. 183-196.

(Continued)

*Primary Examiner*—Patrick J Connolly

(74) *Attorney, Agent, or Firm*—Thomas, Kayden, Horstemeyer & Risley, LLP

(57) ABSTRACT

Various systems and methods for analysis of optical pulses are provided. In one embodiment, an optical system is provided having an optical axis. The optical system includes a two-dimensional diffraction grating positioned along the optical axis, and a spectral filter positioned along the optical axis after the two-dimensional diffraction grating. The spectral filter is angularly offset about a vertical transverse angle associated with the optical system. The diffraction grating is angularly offset about the optical axis relative to the spectral filter, and an optical capture device positioned after the spectral filter.

20 Claims, 10 Drawing Sheets

OTHER PUBLICATIONS

Eric Cormier, Ian A. Walmsley, Ellen M. Kosik, Adam S. Wyatt, Laura Corner and Louis F. Dimauro, "Self-Referencing, Spectrally, or Spatially Encoded Spectral Interferometry for the Complete Characterization of Attosecond Eletromagnetic Pulses", Physical Review Letters, Jun. 9, 2004, The American Physical Society, pp. 33905-1-33905-4.

David N. Fittinghoff, Jason L. Bowie, John N. Sweetser, Richard T. Jennings, Marco A. Krumbugel, Kenneth W. Delong, Rick Trebino and Ian A. Walmsley, "Measurement of the Intensity and Phase of Ultraweak, Ultrashort Laser Pulses", Optics Letters/vol. 31, No. 12, Jan. 11, 1996, pp. 884-886.

J.P. Geindre, P. Audebert, S. Rebibo, and J.C. Gauthier, "Single-Shot Spectral Interferometry with Chirped Pulses", Optics Letters/vol. 26, No. 20, Jan. 3, 2001, pp. 1612-1614.

J.P. Geindre, P. Audebert, A. Rousse, F. Fallies, J.C. Gauthier, A. Mysyrowicz, A. Dos Santos, G. Hamoniaux, and A. Antonetti, "Frequency-Domain Interferometer for Measuring the Phase and Amplitude of a Femtosecond Pulse Probing a Laser-Produced Plasma", Optics Letters/vol. 19, No. 23, Jun. 8, 1994, pp. 1997-1999.

J. Jasapara and W. Rudolph, "Characterization of Sub-10-fs Pulse Focusing with High-Numerical-Aperture Microscope Objectives", Optics Letters/vol. 24, No. 11, Jan. 4, 1999, pp. 777-779.

L. Lepetit, G. Cheriaux, and M. Joffre, "Linear Techniques of Phase Measurement by Femtosecond Spectral Interferometry for Applications in Spectroscopy", J. Opt. Soc. Am. B/vol. 12, No. 12, Mar. 29, 1995, pp. 2467-2474.

D. Meshulach, D. Yelin, and Y. Silberberg, "Real-Time Spatial-Spectral Interference Measurements of Ultrashort Optical Pulses", J. Opt. Soc. Am. B/vol. 14, No. 8, Jan. 31, 1997, pp. 2095-2098.

Robert J. Levis, Getahun M. Menkir, Herschel Rabitz, "Selective Bond Dissociation and Rearrangement with Optimally Tailored, Strong-Field Laser Pulses" Science/vol. 292, pp. 709-713, Apr. 27, 2001, pp. 709-713.

Daniel J. Kane and Rick Trebino, "Characterization of Arbitrary Femtosecond Pulses Using Frequency-Resolved Optical Gating", IEEE Journal of Quantum Electronics/vol. 29, No. 2, Feb. 1993, pp. 571-579.

Dan Oron and Yaron Silberberg, "Spatiotemporal Coherent Control Using Shaped, Temporally Focused Pulses", Optics Express/vol. 13, No. 24, Oct. 31, 2005, pp. 9903-9908.

Chris Iaconis and Ian A. Walmsley, "Self-Referencing Spectral Interferometry for Measuring Ultrashort Optical Pulses", IEEE Journal of Quantum Electronics/vol. 35, No. 4, Apr. 1999, pp. 501-509.

M. Kempe and W. Rudolph, "Femtosecond Pulses in the Focal Region of Lenses", The American Physical Society/vol. 48, No. 6, Apr. 15, 1993, pp. 4721-4729.

M. Kempe and W. Rudolph, "Impact of Chromatic and Spherical Aberration on the Focusing of Ultrashort Light Pulses by Lenses", Optics Letters/vol. 18, No. 2, Aug. 17, 1992, pp. 137-139.

M. Mueller, J. Squier, and G.J. Brakenhoff, Measurement of Femtosecond Pulses in the Focal Point of a High-Numerical-Aperture Lens by Two-Photon Absorption, Optics Letters/vol. 20, No. 9, Sep. 12, 1994, pp. 1038-1040.

M. Kempe, U. Stamm, B. Wilhelmi and W. Rudolph, "Spatial and Temporal Transformation of Femtosecond Laser Pulses by Lenses and Lens Systems", J. Opt. Soc. Am. B/vol. 9, No. 7, Jan. 21, 1992, pp. 1158-1165.

Vadim V. Lozovoy, Igor Pastirk, and Marcos Dantus, "Multiphoton Intrapulse Interference. IV. Ultrashort Laser Pulse Spectral Phase Characterization and Compensation", Optics Letters/vol. 29, No. 7, Aug. 4, 2003, pp. 775-777.

Jonathan R. Birge, Richard Ell, and Franz X. Kartner, Two-Dimensional Spectral Shearing Interferometry for Few-Cycle Pulse Characterization, Optics Letters/vol. 31, No. 13, Mar. 7, 2006, pp. 2063-2065.

Zsolt Bor, Zoltan Gogolak and Gabor Szabo, "Femtosecond-Resolution Pulse-Front Distortion Measurement by Time-of-Flight Interferometry" Optics Letters/vol. 14, No. 16, Feb. 13, 1989, pp. 862-864.

Rebecca Chadwick, Erik Spahr, Jeff A. Squier, Charles G. Durfee, Barry C. Walker, and David N. Fittinghoff, Fringe-Free, Background-Free, Collinear Third-Harmonic Generation Frequency-Resolved Optical Gating Measurements for Multiphoton Microscopy, Optics Letters/vol. 31, No. 22, Jul. 10, 2006, pp. 3366-3368.

David N. Fittinghoff, Jeff A. Squier, C.P.J. Barty, John N. Sweetser, Rick Trebino, and Michiel Muller, "Collinear Type II Second-Harmonic-Generation Frequency-Resolved Optical Gating for Use with High-Numerical-Aperature Objectives", Optics Letters/vol. 23, No. 13, Mar. 19, 1998, pp. 1046-1048.

Ulrike Fuchs, Uwe D. Zeitner and Andreas Tunnermann, "Ultra-Short Pulse Propagation in Complex Optical Systems", Optics Express/vol. 13, No. 10, Mar. 17, 2005, pp. 3852-3861.

Andrei B. Vakhtin, Kristin A. Peterson, William R. Wood, and Daniel J. Kane,"Differential Spectral Interferometry: An Imaging Technique for Biomedical Applications", Optics Letters/vol. 28, No. 15, Feb. 24, 2003, pp. 1332-1334.

Nirit Dudovich, Dan Oron and Yaron Silberberg,"Single-Pulse Coherently Controlled Nonlinear Raman Spectroscopy and Microscopy", Nature/vol. 418, Aug. 2002, pp. 512-514.

Pamela Bowlan, Pablo Gabolde, Aparna Shreenath, Kristan Marshall, Selcuk Akturk, and Rick Trebino, Cross-Beam Spectral Interferometry: A Simple, High-Spectral-Resolution method for Completely Characterizing Complex Ultrashort Pulses in Real Time, Optics Express, vol. 14, No. 24, Nov. 27, 2006, pp. 11892-11900.

J.P. Geindre, P. Audebert, A. Rousse, F. Fallies, J.C. Gauthier, A. Mysyrowicz, A.Dos Santos, G. Hamoniaux, and A. Antonetti, "Frequency-domain interferometer for measuring the phase and amplitude of a femtosecond pulse probing a laser-produced plasma," Optics Letters, vol. 19, No. 23, Dec. 1994, pp. 1997-1999.

T. Tanabe, H. Tanabe, Y. Teramura, and F. Kannari, "Spatiotemporal measurements based on spatial spectral interferometry for ultrashort optical pulses shaped by a Fourier pulse shaper," Journal of the Optical Society of America, vol. 19, No. 11, Nov. 2002, pp. 2795-2802.

I. Gallman, G. Steinmeyer, D.H. Sutter, T. Rupp, C. Iaconis, I.A. Walmsley, and U. Keller, "Spatially resolved amplitude and phase characterization of femtosecond optical pulses," Optics Letters, vol. 26, No. 2, Jan. 2001, pp. 96-98.

C. Dorrer, E.M. Kosik, and I.A. Walmsley, "Direct space-time characterization of the electric fields of ultrashort optical pulses," Optics Letters, vol. 27, No. 7, Apr. 2002, pp. 548-550.

S.A. Diddams, H.K. Eaton, A.A. Zozulya, and T.S. Clement, "Full-field characterization of femtosecond pulses after nonlinear propagation," Conference on Lasers and Electro-Optics, Paper CFF3, May 1998, p. 519.

J. Liang, B. Grimm, S. Goelz, and J.F. Bille, "Objective measurement of wave aberrations of the human eye with the use of a Hartmann-Shack wave-front sensor," Journal of the Optical Society of America, vol. 11, No. 7, Jul. 1994, pp. 1949-1957.

E. Leith, C. Chen, H. Chen, Y. Chen, D. Dilworth, J. Lopez, J. Rudd, P.C. Sun, J. Valdmanis, and G. Vossler, "Imaging through scattering media with holography," Journal of the Optical Society of America, vol. 9, No. 7, Jul. 1992, pp. 1148-1153.

S. Grilli, P. Ferraro, S. De Nicola, A. Finizio, G. Pierattini, and R. Meucci, "Whole optical wavefields reconstruction by Digital Holography," Optics Express, vol. 9, No. 6, Sep. 2001, pp. 294-302.

Z. Liu, M. M Centurion, G. Panotopoulos, J. Hong, and D. Psaltis, "Holographic recording of fast events on a CCD camera," Optics Letters, vol. 27, No. 1, Jan. 2002, pp. 22-24.

P.H. Lissberger, "Properties of All-Dielectric Interference Filters. I. A New Method of Calculation," Journal of the Optical Society of America, vol. 49, No. 2, Feb. 1959, pp. 121-125.

P. O'Shea, M. Kimmel, X. Gu, and R. Trebino, "Highly simplified device for ultrashort-pulse measurement," Optics Letters, vol. 26, No. 12, Jun. 2001, pp. 932-934.

P. Gabolde and R. Trebino, "Single-shot Measurement of the Complete Spatio-temporal Intensity and Phase of an Ultrashort Laser Pulse," Conference on Lasers and Electro-Optics, May 21-26, 2006, Long Beach, California, pp. 1-2.

P. Gabolde and R. Trebino, "Single-shot Holographic Technique for Measuring the Complete Electric Field of an Ultrashort Pulse," Optical Society of America Annual Meeting, Oct. 8-12, 2006, Rochester, NY, 1 page.

P. Gabolde and R. Trebino, "Measurement of the Complete Electric Field of an Ultrashort Laser Pulse from a Single-Exposure Digital Hologram," International Conference on Ultrafast Phenomena, Jul. 31, 2006-Aug. 4, 2006, Pacific Grove, California, pp. 1-3.

P. Gabolde and R. Trebino, "Single-shot measurement of the full spatiotemporal field of ultrashort pulses with multispectral digital holography," Optics Express, vol. 14, No. 23, Nov. 2006, pp. 11460-11467.

R.G. Lane and M. Tallon, "Wave-front reconstruction using a Shack-Hartmann sensor," Applied Optics, vol. 31, No. 32, Nov. 1992, pp. 6902-6908.

P. Gabolde and R. Trebino, "Self-referenced measurements of the complete electric field of ultrashort pulses," Optics Express, vol. 12, No. 19, Sep. 2004, pp. 4423-4429.

* cited by examiner 121
163
119
103a/
109a
116
103
109

50 μm
116

DETERMINING ELECTRIC FIELD CHARACTERISTICS OF LASER PULSES

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of grant number ECS-0200223 awarded by the National Science Foundation of the United States.

BACKGROUND

In ultrafast optics laboratories it is often desirable to measure the spatial or temporal profile of ultrashort pulses. In some situations, separate spatial and temporal measurements are insufficient in order to obtain the desired profile, and complete spatio-temporal dependence of the pulse is needed. For example, a pulse can be contaminated by spatio-temporal distortions that limit the performance of an ultrafast system such as might be the case, for example, with amplified pulses. Alternatively, the pulse may have been used to excite or probe complex media with time-varying spatial structure. Indeed, spatial-temporal distortions are quite common, and only very carefully and precisely aligned pulses can be considered to be free of such distortions. Unfortunately, such precisely aligned pulses are generally obtained at significant cost and effort.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
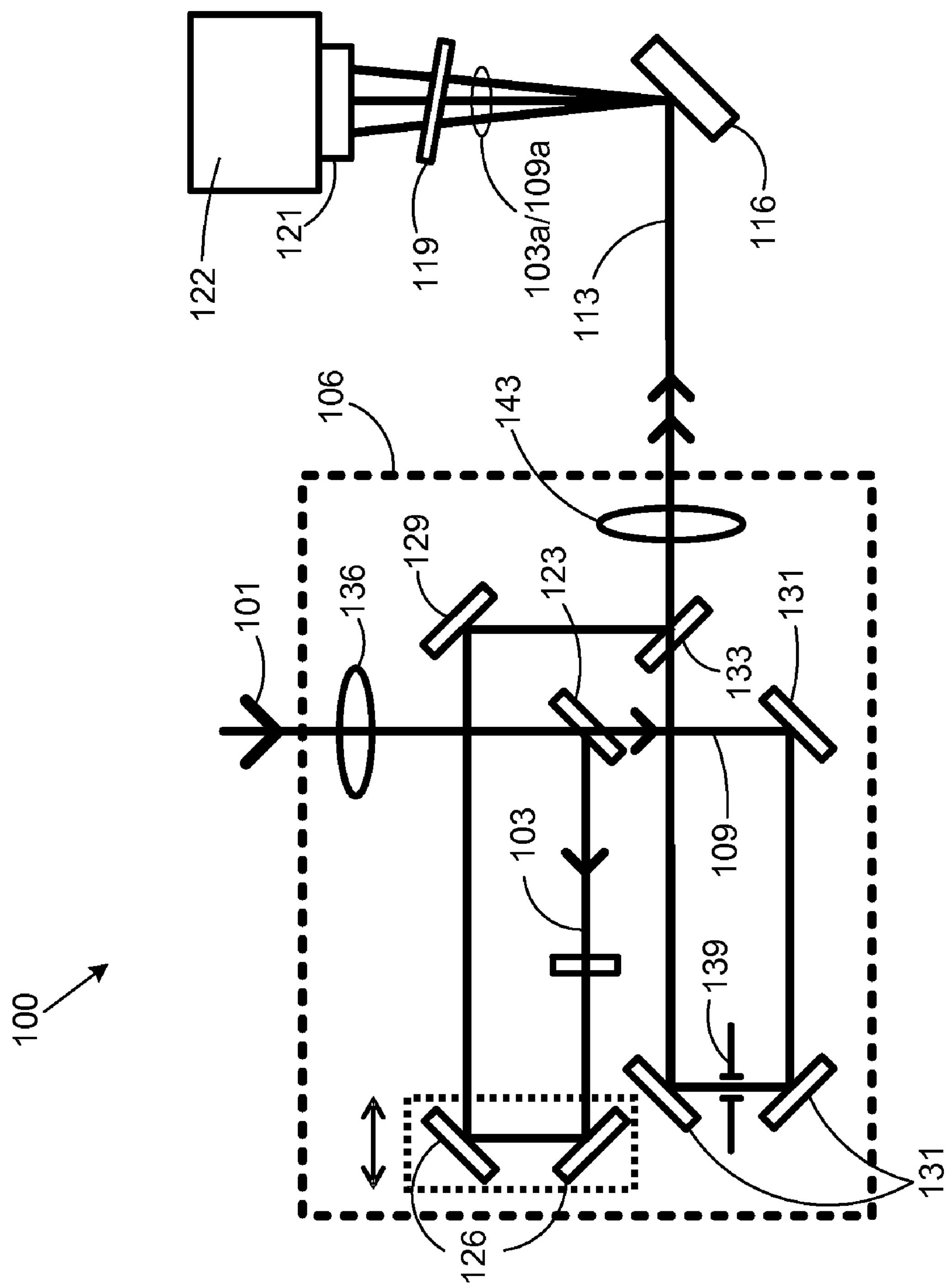
FIG. 1 is drawing an optical system employed to determine electric field characteristics of a laser pulse according to an embodiment of the present invention.

Referring to FIG. 1, shown is an optical system 100 according to an embodiment of the present invention. As an input, the optical system 100 receives an input signal pulse 101. The optical system 100 includes optical elements 106 that are configured to separate the input signal pulse 101 into a reference pulse 109 and a signal pulse 103. The optical elements 106 align the propagation of the reference pulse 109 and the signal pulse 103 along crossing trajectories 113 toward a two-dimensional diffraction grating 116, a spectral filter 119, and an image capture device 121 included, for example, in a camera 122 as will be described. The spectral filter 119 may comprise, for example, a band-pass interference filter or other appropriate filter that provides for frequency filtering as will be described below. The image capture device 121 may comprise, for example, a charge coupled device (CCD) array or other image capture device as can be appreciated. As shown in FIG. 1, the crossing trajectories are shown in the same plane due to the top view shown, although the crossing nature of the trajectories is illustrated in later figures to be described.

The signal pulse 101 may comprise, for example, an ultrashort laser pulse such as a pulse generated by a mode-locked laser or an amplifier, with a pulse duration in the femtosecond regime and a pulse energy in the nanojoule to millijoule range. Given that the splitter 123 comprises, for example, a partially silvered mirror (i.e. a 50% silvered mirror), both the signal pulse 103 and the reference pulse 109 are substantial replicas (with half of the power, etc.) of the input signal pulse 101, until the reference pulse 109 undergoes filtering as will be described.

According to various embodiments, the nature of the full spatio-temporal electric field of the signal pulse 103 is either entirely or partially unknown. The optical system 100 provides for the determination of the full spatio-temporal electric field profile of the signal pulse 103 based on a single pulse. Based on this information, the spatio-temporal electric field of the input signal pulse 101 is determined since the signal pulse 103 is effectively a 50% copy of the input signal pulse 101.

To this end, the optical elements 106 of the optical system 100 include a splitter 123, adjustable mirrors 126, and stationary mirrors 129 and 131. The optical elements 106 also include a one-sided mirror 133 that allows the reference pulse 109 to pass therethrough while reflecting the signal pulse 103 as shown. The optical elements 106 further include a lens 136 that focuses the input signal pulse 101 from the source.

The reference pulse 109 is filtered by a spatial filter 139. Such a filter may comprise, for example, a pinhole in the focal plane of a telescope. According to one example embodiment, the pinhole may be 50 microns in diameter, although pinholes of other sizes may be employed depending on the input beam size and the lenses that are chosen.

The optical elements 106 also include a lens 139 through which the signal and reference pulses 103 and 109 are directed as they propagate toward the two-dimensional grating 116.

Associated with the optical system 100 is an optical axis. The optical axis generally follows the direction of propagation of the signal/reference pulses 103/109 through the optical system 100 and falls at a center point of each of the optical elements 106, the two-dimensional diffraction grating 116, the spectral filter 119, and the image capture device 121. In this respect, the optical axis is a term of art as applied to the optical system 100 and other optical arrangements as can be appreciated.

Next, a description of the operation of the optical system 100 is provided. Given that the electric field profile or characteristics of the signal pulse 101 are unknown, it is assumed that one desires to determine such information. Such information may be desired, for example, to aid in the adjustment or calibration of a laser light source or to determine the qualities of a substance through which the signal pulse has passed, etc.

To this end, the input signal pulse 101 is directed along the optical axis of the optical system 100 into the lens 133 and to the splitter 123. One portion of the input signal pulse 101 is reflected by the splitter 123 to the adjustable mirrors 126. The adjustable mirrors can be moved along an axis in a single direction as shown to adjust the distance of travel of the signal pulse 103 so as to be able to synchronize the phase of the signal pulse 103 with the phase of the reference signal 109. The signal pulse 103 is reflected by the adjustable mirrors 126 and the stationary mirror 129 to the one-sided mirror 133.

The reference pulse 109 that is split from the input signal pulse 101 is directed by mirrors 131 to the one-sided mirror 133. Along the way, the reference pulse 109 is filtered by the spatial filter 139 to result in a uniform electric field of the reference pulse 109.

The positioning of the mirrors 131 result in the propagation of the reference pulse 109 in a trajectory that is parallel to a trajectory of the propagation of the signal pulse 103. The trajectories of the reference pulse 109 and the signal pulse 103 after the one-sided mirror 133 are thus parallel separated by a distance d.

After the one-sided mirror 133, the signal and reference pulses 103 and 109 are directed to the lens 143 positioned before the two-dimensional grating 116 that redirects the propagation of the reference pulse 109 and the signal pulse 103 from the parallel trajectories to crossing trajectories directed toward the two-dimensional grating 116. The crossing trajectories comprise trajectories that are directed toward each other such that they will pass through each other if allowed to proceed to a common point of both trajectories. In one embodiment, the crossing trajectories are symmetric with respect to the optical axis and collide at the optical axis as it passes through the two-dimensional grating 116 and the spectral filter 119.

The signal and reference pulses 103 and 109 proceed along the crossing trajectories to the two-dimensional grating 116. The two-dimensional grating 116 separates both the signal and reference pulses 103 and 109 into a plurality of pairs of component signal and reference pulses 103*a* and 109*a*. The two-dimensional grating 116 is angularly offset by a predefined angle $\phi$ about the optical axis.

The component signal and reference pulses 103*a* and 109*a* proceed toward the spectral filter 119. The spectral filter 119 is positioned so that when each respective pair of component signal and reference pulses 103*a* and 109*a* pass through the spectral filter 119, each pair is filtered at a frequency band that is unique to the respective pair of component signal and reference pulses 103*a* and 109*a*. The frequency band is a narrow band of frequencies depending upon where the respective component signal and reference pulses 103*a* and 109*a* pass through the spectral filter 119. Each of the pairs of the component signal and reference pulses 103*a* and 109*a* intersect at the image capture device 121, thereby creating a quasi-monochromatic hologram on the image capture device 121 as the result of the interference between the respective component signal and reference pulses 103*a* and 109*a*.

The hologram generated by each pair of component signal and reference pulses 103*a* and 109*a* is termed "quasi-monochromatic" because they actually include a small band of frequencies depending upon the filtering performed by the spectral filter 119 rather than being restricted to a single frequency. Given that the band of frequencies associated with each hologram is relatively small, it is termed quasi-monochromatic since there are relatively few frequencies in each hologram, where the information contained in the hologram is effectively rendered monochromatic.

Once the holograms are generated on the image capture device 121, a two-dimensional Fast Fourier Transform (2DFFT) is applied to the image from the image capture device 121 of the camera 122. In the Fourier plane, the terms relating to the interference of the respective component signal and reference beams 103*a* and 109*a* are isolated and transformed back to the original x-y plane. The resulting image includes both the spatial amplitude and phase of each of the quasi-monochromatic holograms. The spatial amplitude and phase is provided, but there is some expense in terms of a loss of vertical spatial resolution. However, this loss is deemed not to be critical. As will be discussed in greater detail below, a registration step is performed to center all of the spatial distributions and to assign the calibrated wavelengths in order to obtain multi-spectral complex data $E(x, y, \omega)$ of the signal pulse 103.

Figure 2:
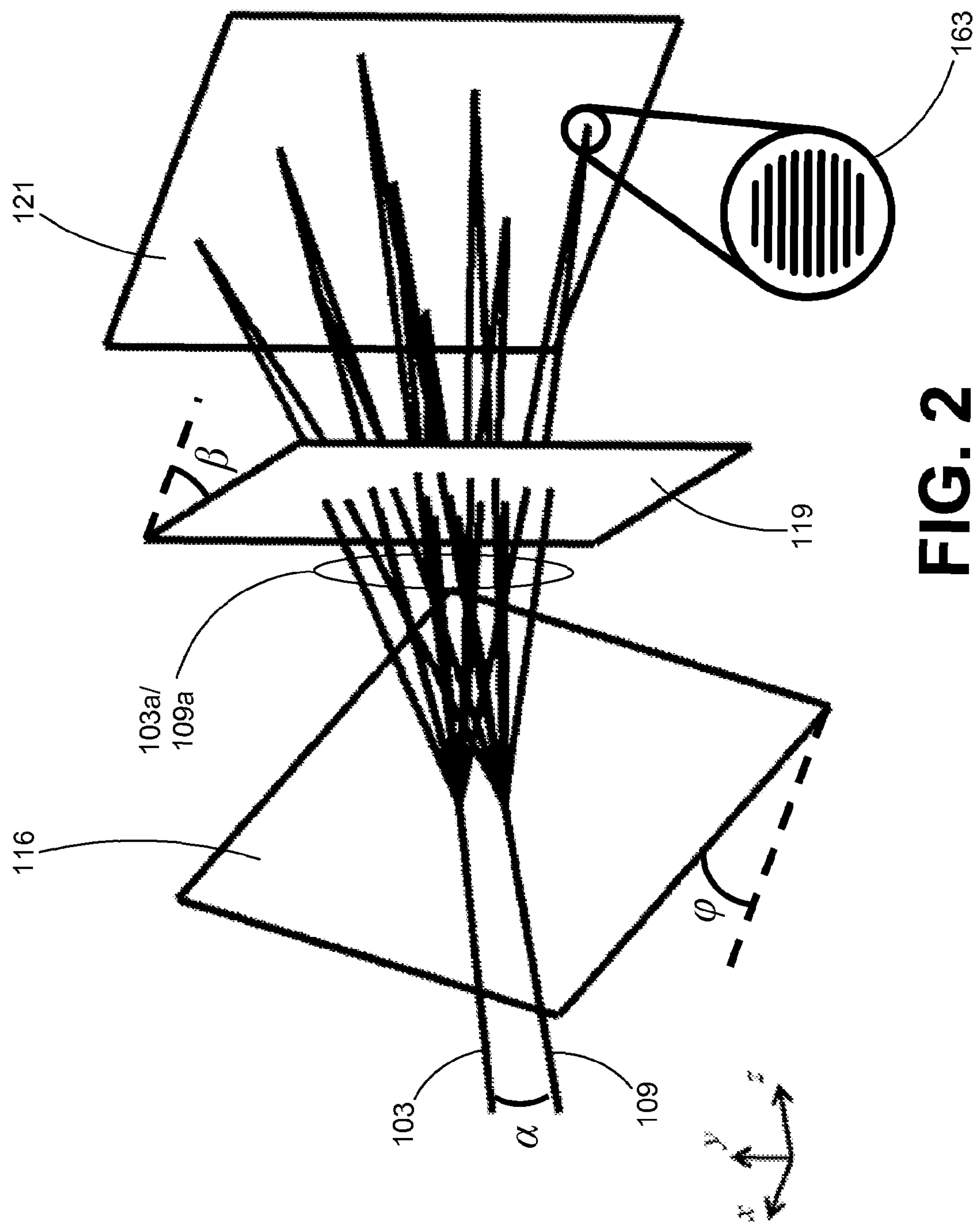
FIG. 2 is a drawing of a portion of the optical system of FIG. 1 according to an embodiment of the present invention.

Referring to FIG. 2, shown is a view of a portion of the optical system 100 according to an embodiment of the present invention. As shown, the signal pulse 103 and the reference pulse 109 propagate along crossing trajectories toward the two-dimensional grating 116. The geometry of the crossing trajectories is such that they form an angle $\alpha$. Once the signal pulse 103 and the reference pulses 109 collide with the two-dimensional grating 116, they are separated into the pairs of component signal and reference pulses 103*a* and 109*a*. The respective pairs of pulses 103*a*/109*a* proceed through the spectral filter 119 and produce the quasi-monochromatic holograms 163.

The two-dimensional grating 116 is angularly offset about the optical axis of the optical system 100 by an angle $\phi$. Also, the spectral filter 119 is angularly offset about a vertical transverse axis associated with the optical system 100 by an angle $\beta$. The positioning of the two-dimensional grating 116 relative to the spectral filter 119 as such facilitates the filtering of each pair of pulses 103*a*/109*a* by a band pass filter with a center frequency that is unique for each pair of pulses 103*a*/109*a*. That is to say, each pair of pulses 103*a*/109*a* is filtered by a band pass filter that has a center frequency that is different than the center frequency of the band pass filter for the remaining ones of the pairs of pulses 103*a*/109*a*. This is the case because the positioning of the two-dimensional grating 116 and the spectral filter 119 as such allows each pair of pulses 103*a*/109*a* to pass through the spectral filter 119 at a different horizontal position with respect to the spectral filter, thereby causing each pair of pulses 103*a*/109*a* to be filtered at a different band of frequencies. The filtering of the individual pairs of pulses 103*a*/109*a* in this manner is termed "frequency filtering" as contemplated herein. The use of the two-dimensional grating 116 and the spectral filter 119 as set forth above advantageously provides the ability to create several quasi-monochromatic holograms 163 with a minimum of optical components.

Figure 3:
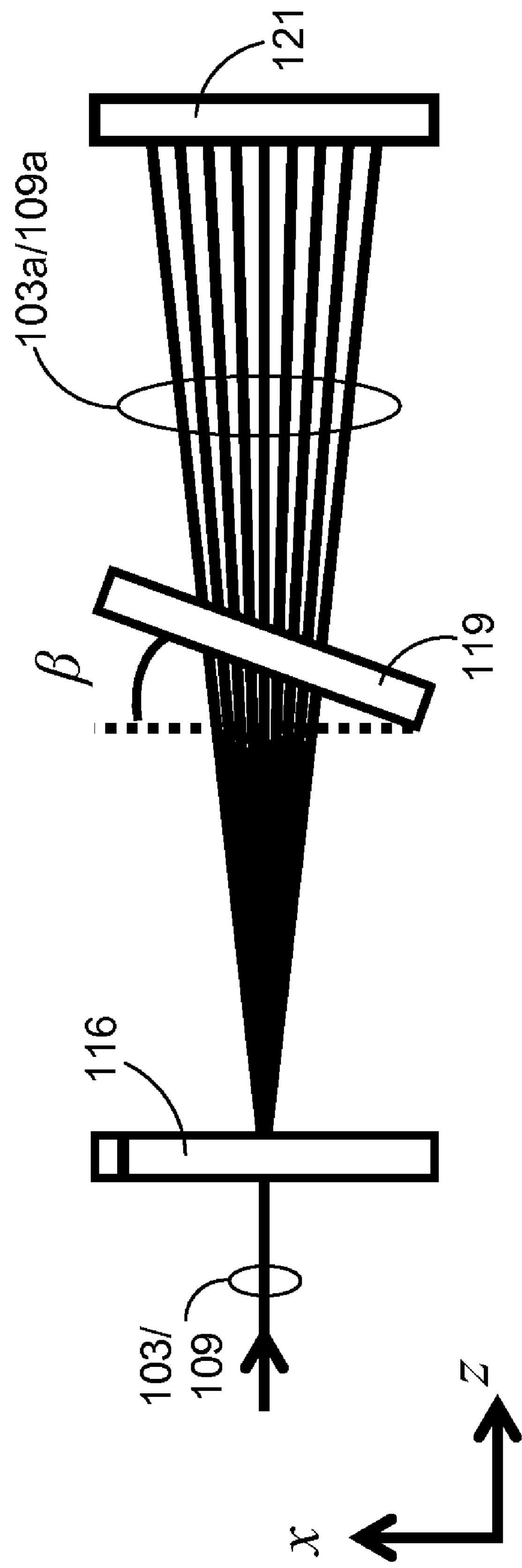
FIG. 3 is a drawings of a top view of the portion of the optical system depicted in FIG. 2 according to an embodiment of the present invention.

Referring next to FIG. 3, shown is a top view of the portion of the optical system 100 depicted in FIG. 2 according to an embodiment of the present invention. The top view of FIG. 3 further illustrates the angular offset of the two-dimensional grating 116 about the optical axis of the optical system 100. The top view also further illustrates the angular offset angle β of the spectral filter 119. The angular offset of the spectral filter 119 results in greater vertical separation between the respective locations at which the pairs of pulses 103*a*/109*a* pass through the spectral filter 119.

Figure 4:
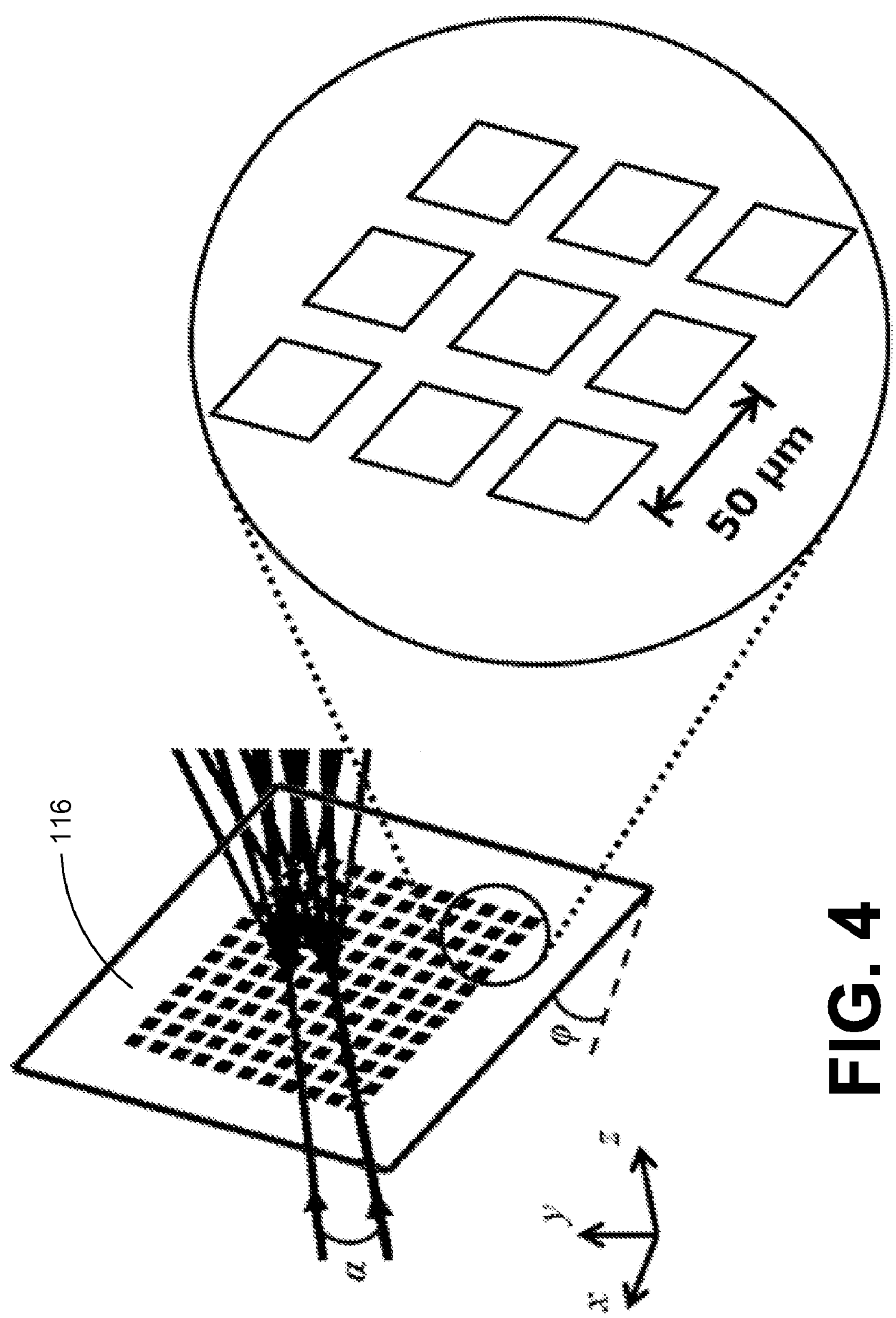
FIG. 4 is a drawing of a two-dimensional grating employed in the portion of the optical system depicted in FIG. 2 according to an embodiment of the present invention.

With reference to FIG. 4, shown is one example of the two-dimensional grating 116 that comprises a grid of opaque squares according to one embodiment. According to one example, the two-dimensional grating 116 includes a grid of squares that are positioned at 50 μm intervals, although two-dimensional gratings with other intervals may be employed depending upon the desired spatial separation of the quasi-monochromatic holograms projected onto the image capture device 121 (FIG. 2).

Figure 5:
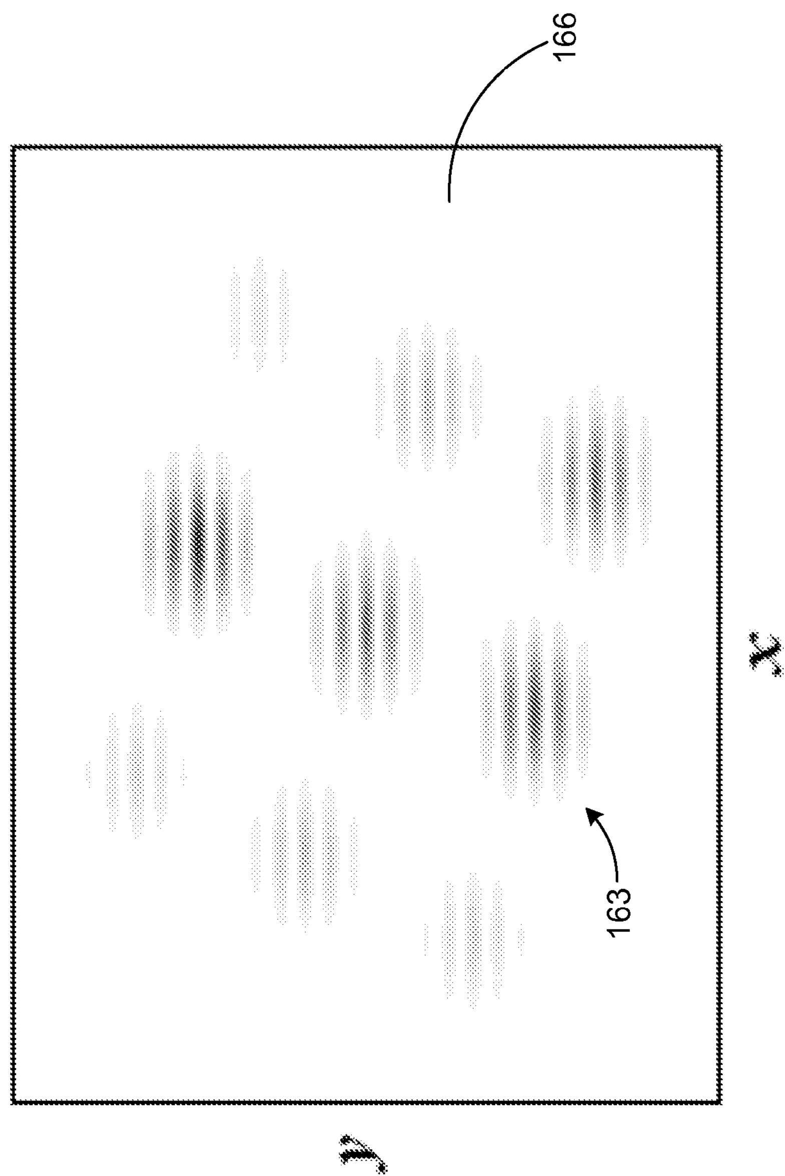
FIG. 5 is an example of an image that is generated by the optical system of FIG. 1 according to an embodiment of the present invention.

Referring to FIG. 5, shown is an image 166 of the quasi-monochromatic holograms 163 created by interference between respective signal pulses 103*a* and reference pulses 109*a* as it would appear on the image capture device 121. The quasi-monochromatic holograms 163 generally include fringes related to the interference between the respective pulses 103*a*/109*a*.

Figure 6:
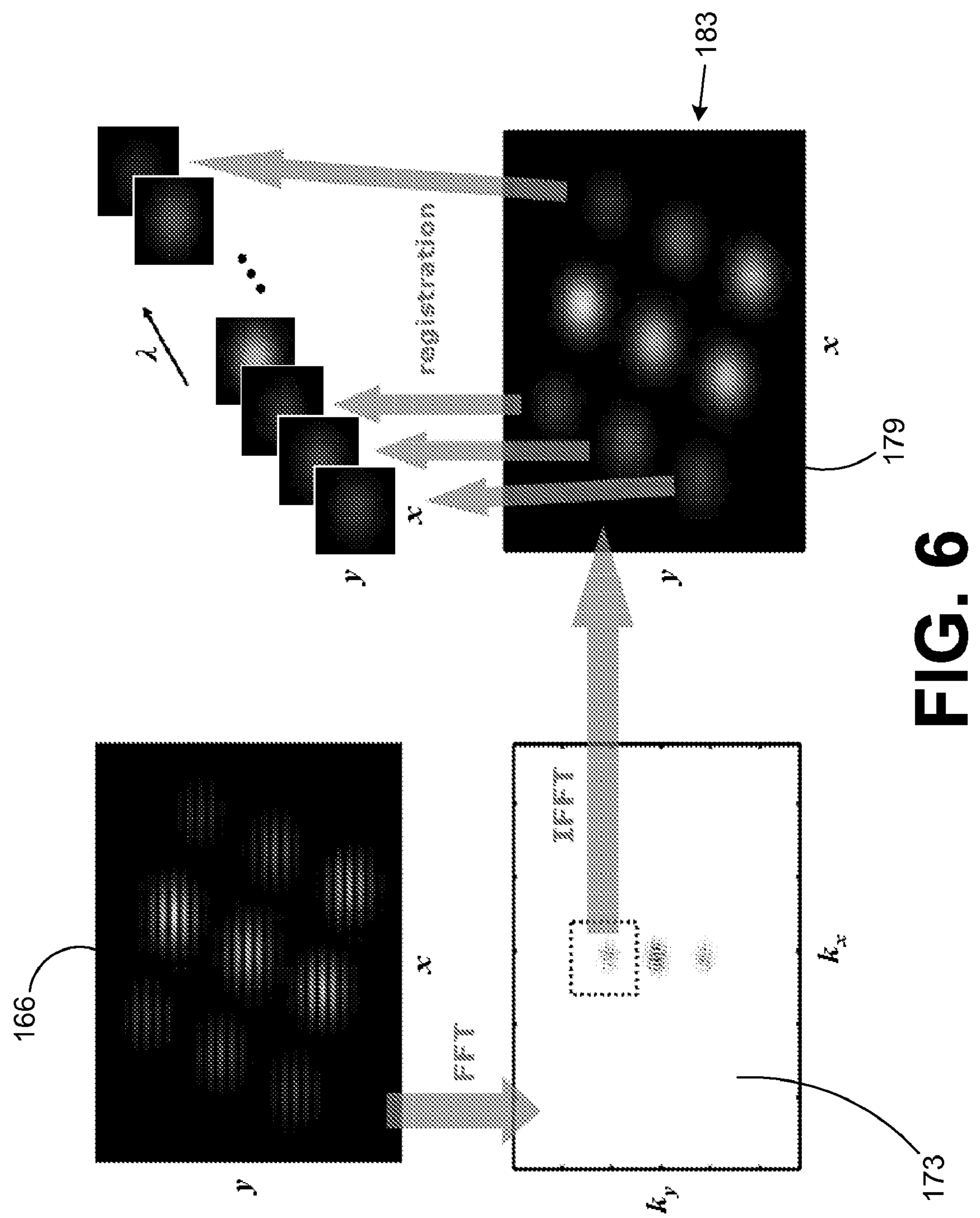
FIG. 6 is a drawing that illustrates processing of the image of FIG. 5 in order to obtain characterize the electric field of the signal pulse used to generate the image of FIG. 5 according to an embodiment of the present invention.

Turning then to FIG. 6, shown is an image that illustrates the processing performed after the image 166 of the holograms 163 (FIG. 5) is generated and captured by the image capture device 121. Once the image 166 is captured, a two-dimensional Fast Fourier Transform (FFT) is performed on the image 163, thereby generating the FFT image 173. Next, a sideband 176 of the FFT image 173 is cropped and an inverse Fast Fourier Transform is performed to generate a subsequent image 179 in the original x-y plane. The image 179 is then converted into three dimensional complex data using calibration data that indicates appropriate spot centers and wavelength for each spot 183 in the image 179. Finally, a one-dimensional FFT is performed in the frequency dimension to obtain a 3 dimensional complex profile of the electric field E(x, y, t) of the signal pulse 103 (FIG. 1). The processing may be performed, for example, using a computer system that runs appropriate programs such as Matlab and other systems as will be described.

Figure 7:
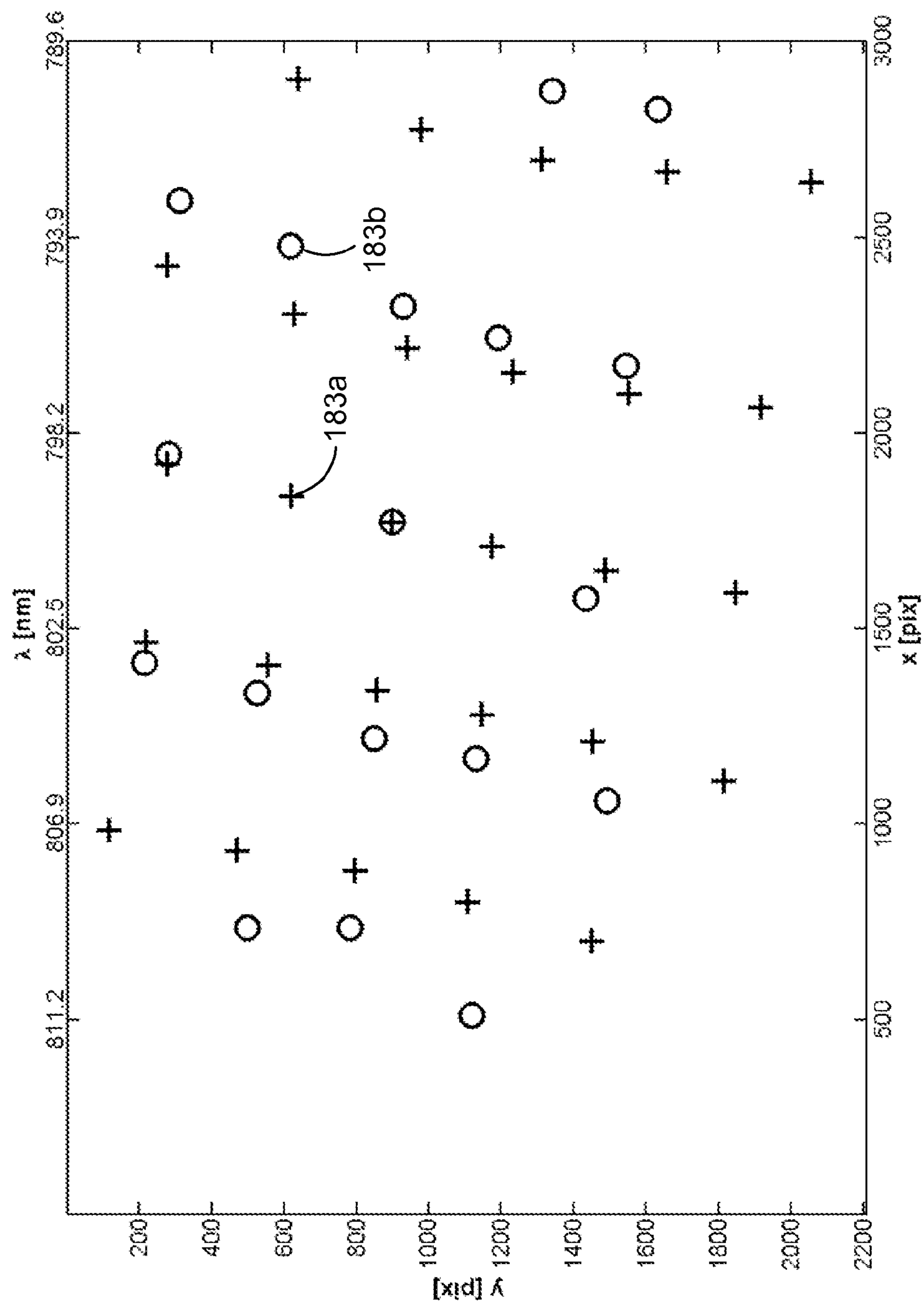
FIG. 7 is a drawing that provides one illustration of the plot of the centers of an image generated from the image of FIG. 5 as compared to the plot of information from a calibration pulse according to an embodiment of the present invention.

Referring next to FIG. 7, shown is a chart 203 that depicts the locations of the spots 183 in the image 179 (FIG. 6) generated by the inverse Fast Fourier Transform of the sideband 176 (FIG. 6) of the FFT image 173 (FIG. 6) according to an embodiment of the present invention. The chart 203 depicts the spots 183*a* generated by a known pulse with a uniform electric field. Such a pulse is used for purposes of calibration and generally is a pulse with little or no spatial chirp or other anomalies. In particular, the center points of the spots 183*a* of the calibration pulse are stored in memory for future use in generating three-dimensional complex data from the inverse Fast Fourier Transform of the sideband 176. Both the position of the spot centers and the frequencies associated therewith are stored.

The spots 183*b* are generated from a signal pulse 103 that is unknown. The spatial chirp of the signal pulse 103 that generates the spots 183*b* can be determined by plotting the distance between respective pairs of spots 183*a* and 183*b* in the x dimension as a function of frequency.

Figure 8:
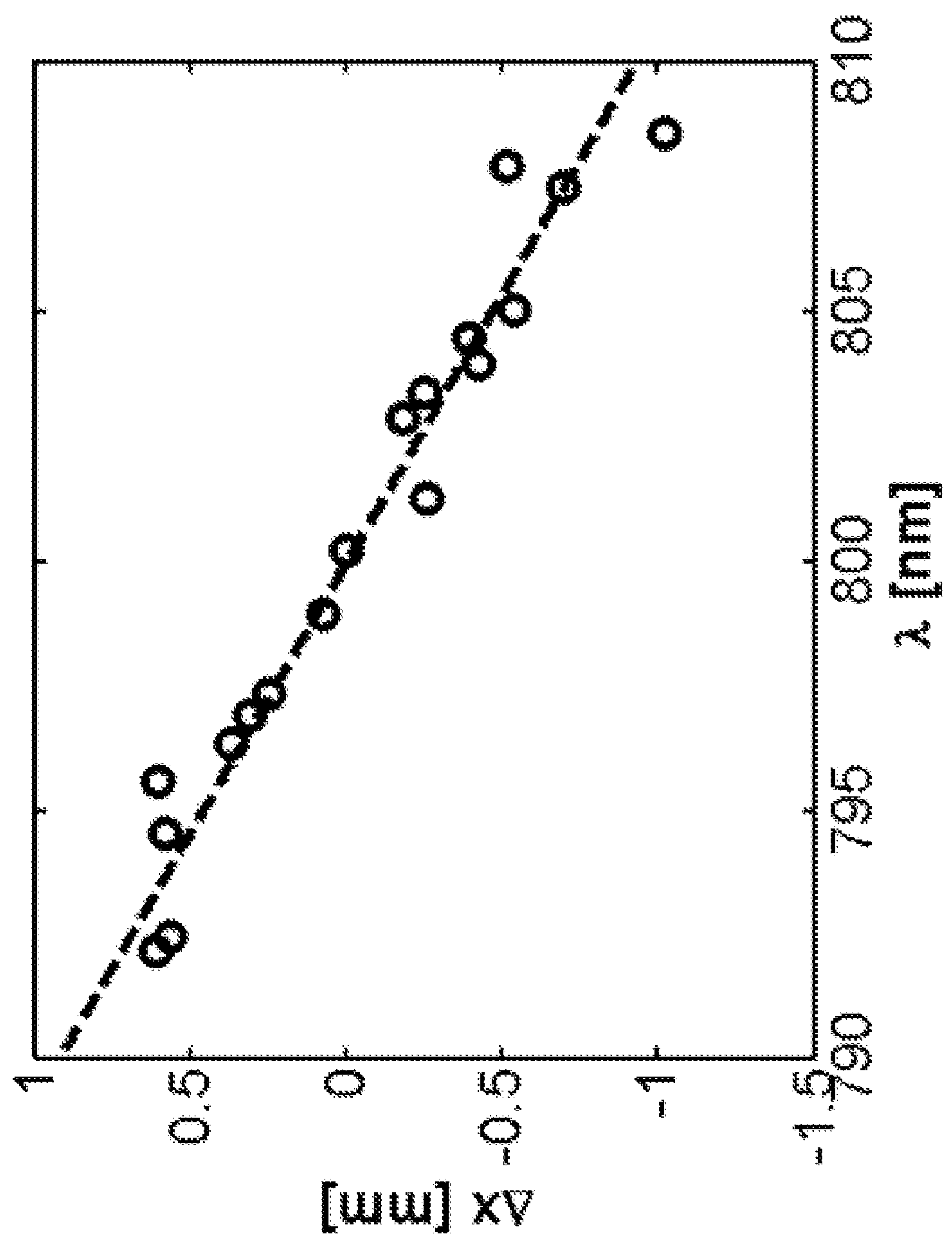
FIG. 8 is a drawing that illustrates a degree of spatial chirp in the signal pulse that generated the image of FIG. 5 according to an embodiment of the present invention.

Referring to FIG. 8, shown is a graph that depicts the difference in the x dimension between the respective pairs of spots 183*a* and 183*b* (denoted as (denoted as Δx) as a function of frequency. The dashed line is a linear fit to the data that is used to calculate the value of the spatial chirp. The severity of the slope of the resulting graph corresponds to the severity of the spatial chirp.

Figure 9:
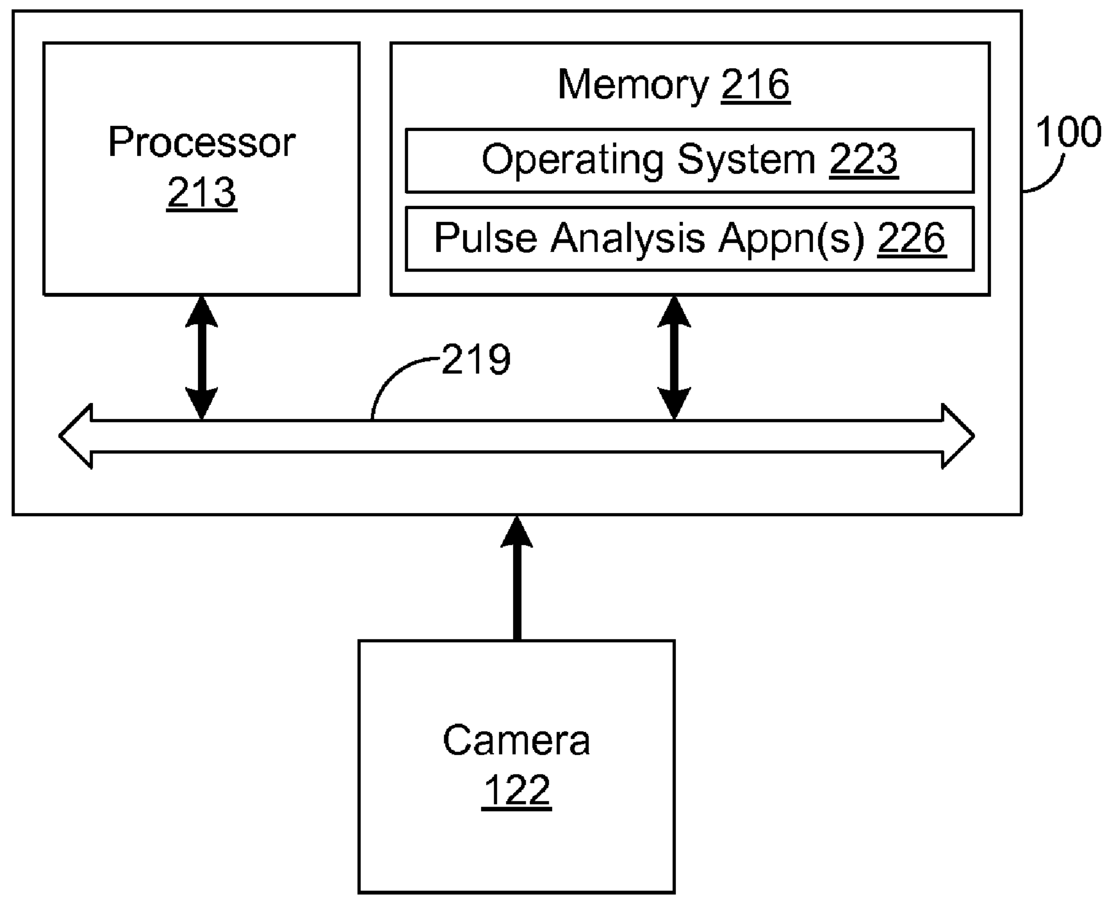
FIG. 9 is a block diagram of one example system that is employed to process the image of FIG. 5 in order to obtain characterize the electric field of the signal pulse used to generate the image of FIG. 5 according to an embodiment of the present invention.

Turning then to FIG. 9, shown is a block diagram of a computer system 100 that is attached to the camera 122 according to an embodiment of the present invention. The computer system 100 may comprise, for example, a computer, server, dedicated processing system, or other system as can be appreciated. The computer system 100 may include various input devices such as a keyboard, microphone, mouse, or other device as can be appreciated. The computer system 100 includes a processor circuit having a processor 213 and a memory 216, both of which are coupled to a local interface 219. The local interface 219 may be, for example, a data bus with a control/address bus as can be appreciated.

Stored on the memory 216 and executable by the processor 213 are an operating system 223 and a pulse analysis application(s) 226. The pulse analysis application(s) 226 are executed in order to determine the profile of the electric field E(x, y, t) of the signal pulse 103 (FIG. 1). The pulse analysis application(s) 226 may comprise, for example, one or more applications executed to perform various functionality. Such applications may comprise, for example, Matlab, LabView or any compiled code.

The components stored in the memory 216 may be executable by the processor 213. In this respect, the term "executable" means a program file that is in a form that can ultimately be run by the processor 213. Examples of executable programs may be, for example, a compiled program that can be translated into machine code in a format that can be loaded into a random access portion of the memory 216 and run by the processor 213, or source code that may be expressed in proper format such as object code that is capable of being loaded into a of random access portion of the memory 216 and executed by the processor 213, etc. An executable program may be stored in any portion or component of the memory 216 including, for example, random access memory, read-only memory, a hard drive, compact disk (CD), floppy disk, or other memory components.

The memory 216 is defined herein as both volatile and nonvolatile memory and data storage components. Volatile components are those that do not retain data values upon loss of power. Nonvolatile components are those that retain data upon a loss of power. Thus, the memory 216 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 213 may represent multiple processors and the memory 216 may represent multiple memories that operate in parallel. In such a case, the local interface 219 may be an appropriate network that facilitates communication between any two of the multiple processors, between any processor and any one of the memories, or between any two of the memories etc. The processor 213 may be of electrical or optical construction, or of some other construction as can be appreciated by those with ordinary skill in the art.

The operating system 223 is executed to control the allocation and usage of hardware resources such as the memory, processing time and peripheral devices in the computer system 100. In this manner, the operating system 223 serves as the foundation on which applications depend as is generally known by those with ordinary skill in the art.

Figure 10:
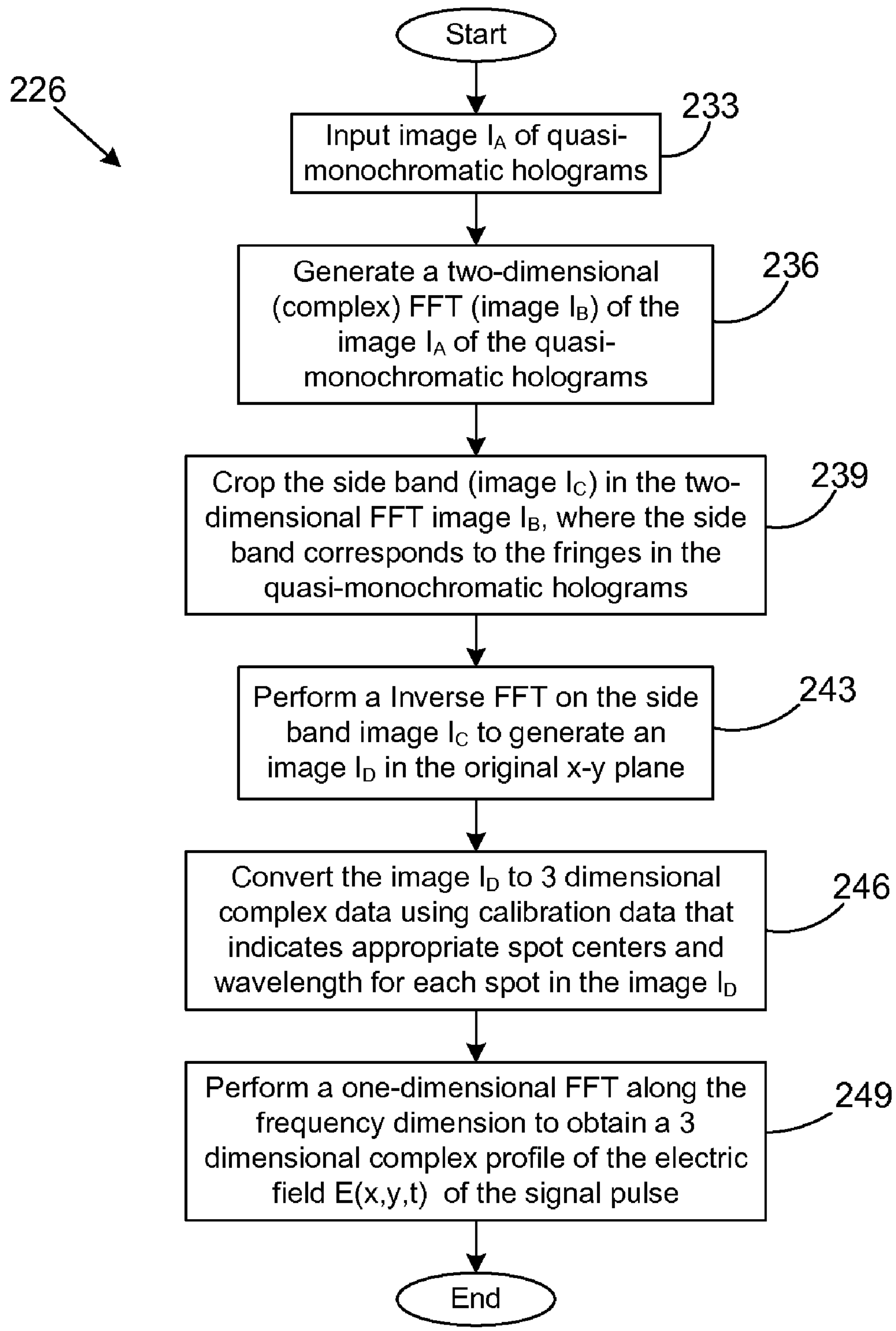
FIG. 10 is one example of a flow chart of the system or method implemented in order to process the image of FIG. 5 according to an embodiment of the present invention.

Referring next to FIG. 10, shown is a flow chart that provides one example of the operation of a pulse analysis application 226 according to an embodiment of the present invention. Alternatively, the flow chart of FIG. 10 may be viewed as depicting steps of an example of a method implemented in the computer system 100 to process the image 166 (FIG. 5) that includes a plurality of quasi-monochromatic holograms 163 (FIG. 5). The functionality of the pulse analysis application 226 as depicted by the example flow chart of FIG. 10 may be implemented, for example, in an object oriented design or in some other programming architecture. Assuming the functionality is implemented in an object oriented design, then each block represents functionality that may be implemented in one or more methods that are encapsulated in one or more objects. The pulse analysis application 226 may be implemented using any one of a number of programming languages such as, for example, C, C++, or other programming languages.

Beginning with box 233, the image 166 (FIG. 6) of the quasi-monochromatic holograms 163 (FIG. 5) generated and captured by the camera 122 (FIG. 9) is received in the memory, for example, as an input from the camera 122. Next, in box 236, a two-dimensional Fast Fourier Transform (FFT) is performed on the image 163, thereby generating the FFT image 173 (FIG. 6). Then, in box 239, a sideband 176 (FIG. 6) of the FFT image 173 is cropped that corresponds to the fringes in the quasi-monochromatic holograms 163.

In box 243 an inverse Fast Fourier Transform is performed to generate a subsequent image 179 (FIG. 6) in the original x-y plane. Then, in box 246, the image 179 is then converted into three dimensional complex data using the spot center and wavelength data taken from the calibration pulse as was discussed with reference to FIG. 7. Thereafter, in box 249, a one-dimensional FFT is performed in the frequency dimension to obtain a three-dimensional complex profile of the electric field E(x, y, t) of the signal pulse 103 (FIG. 1).

Although the example of the pulse analysis application 226 set forth above is depicted as being embodied in software or code executed by general purpose hardware as discussed above, as an alternative the same may also be embodied in dedicated hardware or a combination of software/general purpose hardware and dedicated hardware. If embodied in dedicated hardware, the pulse analysis application 226 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 10 shows the functionality and operation of one example implementation of a pulse analysis application 226. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the example pulse analysis application 226 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the pulse analysis application 226 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method, comprising the steps of:

propagating a signal pulse and a reference pulse along a pair of crossing trajectories; and simultaneously generating a plurality of quasi-monochromatic holograms from the signal pulse and the reference pulse.

2. The method of claim 1, wherein the step of simultaneously generating the plurality of quasi-monochromatic holograms from the signal pulse and the reference pulse further comprises the steps of:

separating the signal and reference pulses into a plurality of pairs of component signal and reference pulses; and frequency filtering the respective pairs of component signal and reference pulses, wherein each of the quasi-monochromatic holograms results from the interference between the corresponding pairs of the component signal and reference pulses.

3. The method of claim 1, further comprising the step of splitting an input signal pulse into the signal pulse and the reference pulse.

4. The method of claim 3, further comprising the step of aligning the phase of the signal and reference pulses.

5. The method of claim 3, further comprising the step of filtering the reference pulse with a spatial filter.

6. The method of claim 2, wherein the step of separating the signal and reference pulses into the pairs of component signal and reference pulses further comprises the step of directing the signal and reference pulses through a two-dimensional diffraction grating.

7. The method of claim 6, further comprising the step of angularly offsetting the two-dimensional diffraction grating about an optical axis of an optical system.

8. The method of claim 2, wherein each of the respective pairs of component signal and reference pulses are filtered by a corresponding one of a plurality of predefined pass bands.

9. The method of claim 8, wherein the filtering of each of the corresponding one of the plurality of predefined pass bands is accomplished by propagating the respective pairs of component signal and reference pulses through a spectral filter angularly offset about a vertical transverse axis associated with the optical system.

10. The method of claim 1, further comprising the step of obtaining the spatial intensity and phase of each of the quasi-monochromatic holograms.

11. The method of claim 10, further comprising the step of reconstructing the electric field of the signal pulse in the time domain based upon the spatial intensity and phase of each of the quasi-monochromatic holograms.

12. A optical system having an optical axis, comprising:

a two-dimensional diffraction grating positioned along the optical axis;

a spectral filter positioned along the optical axis after the two-dimensional diffraction grating, the spectral filter being angularly offset about a vertical transverse angle associated with the optical system;

the diffraction grating being angularly offset about the optical axis relative to the spectral filter; and an optical capture device positioned after the spectral filter.

13. The optical system of claim 12, further comprising optical elements configured to split an input signal pulse into a reference pulse and a signal pulse, the optical elements aligning a propagation of the reference pulse and the signal pulse along crossing trajectories toward the two-dimensional diffraction grating and the spectral filter.

14. The optical system of claim 13, wherein the reference pulse is phase aligned with the signal pulse.

15. The optical system of claim 13, wherein the optical elements further comprise a spatial filter positioned along an optical axis associated with the reference pulse.

16. The optical system of claim 13, wherein the optical elements further comprise a plurality of mirrors that are configured to align the propagation of the reference pulse and the signal pulse along parallel trajectories.

17. The optical system of claim 16, further comprising a lens positioned before the two-dimensional grating that redirects the propagation of the reference pulse and the signal pulse from the parallel trajectories to the trajectories.

18. A system, comprising:

means for aligning a propagation of a signal pulse and a reference pulse along a pair of crossing trajectories; and means for simultaneously generating a plurality of quasi-monochromatic holograms from the signal pulse and the reference pulse.

19. The system of claim 18, wherein the means for aligning the propagation of the signal pulse and the reference pulse further comprises means for splitting an input signal pulse into the reference pulse and the signal pulse.

20. The system of claim 18, further comprising:

means for determining the spatial intensity and phase of each of the quasi-monochromatic holograms; and means for reconstructing the electric field of the signal pulse in the time domain based upon the spatial intensity and phase of each of the quasi-monochromatic holograms.

* * * * *